T. H. KANE.
CLAMP.
APPLICATION FILED JULY 21, 1919.

1,332,442.

Patented Mar. 2, 1920.

Inventor
Thomas H. Kane
By Edward N. Pagelsen
Attorney

UNITED STATES PATENT OFFICE.

THOMAS H. KANE, OF YOUNGSTOWN, OHIO.

CLAMP.

1,332,442.  Specification of Letters Patent.  Patented Mar. 2, 1920.

Application filed July 21, 1919. Serial No. 312,268.

*To all whom it may concern:*

Be it known that I, THOMAS H. KANE, a citizen of the United States, and residing at Youngstown, in the county of Mahoning and State of Ohio, have invented new and Improved Clamps, of which the following is a specification.

This invention relates to means for securing together a plurality of plates or other objects of limited thickness, and its object is to provide a clamping device which can be produced at low cost, which can be quickly secured in place, and which will firmly press together the objects to which it is attached.

This clamp consists of a metal body portion formed of two sides integrally connected by a cross piece or bridge piece, said sides having slots, the plane of which is at an acute angle to the plane of the bridge piece; and a wedge adapted to be driven in between the bridge piece of the clamp and the articles which are to be secured together, and which are positioned in said slots.

Figure 1:
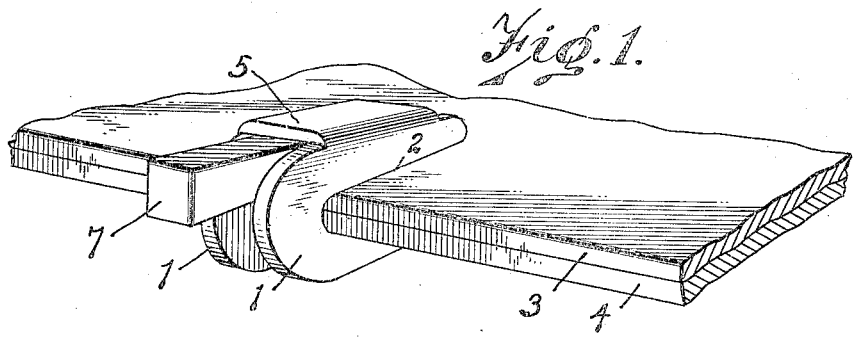
Figure 2:
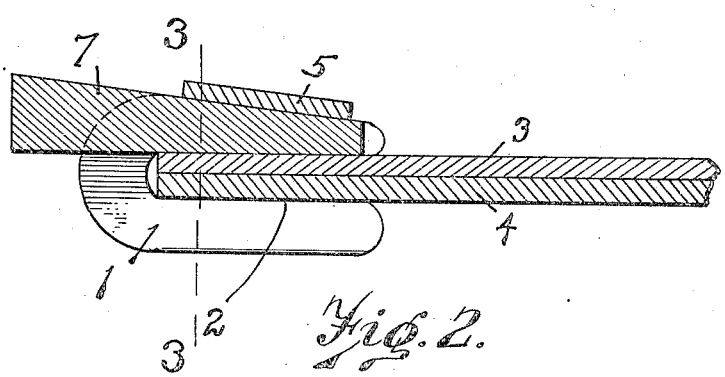
Figure 3:
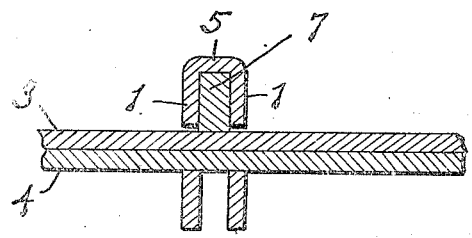

In the accompanying drawing, Figure 1 is a perspective view showing this improved clamp securing two sheets of metal together. Fig. 2 is a longitudinal section of the clamp and of the sheets secured together thereby. Fig. 3 is a section on the line 3—3 of Fig. 2.

Similar reference characters refer to like parts throughout the several views.

The clamp shown in the drawings is formed of the substantially U-shaped sides 1 having slots 2 to receive the sheets 3 and 4 or other articles to be secured together. Connecting the sides is a cross-piece or bridge-piece 5, the plane of which makes an acute angle with the plane of the adjacent walls of the slots in the sides 1. After the clamp has been slipped over the edges of the parts 3 and 4, which are to be secured together, as shown in the drawings, a wedge 7 is driven in and securely locks the several parts together.

This clamp may be sheared from heavy sheet metal and thereafter bent to the form shown in the drawings and the wedge may be likewise sheared from plates of the proper thickness, or both the clamp and the wedge may be of castings. When the wedge has been driven home it requires substantially the same force to release it as was required to drive it home, the slight irregularities of the surface causing the contacting surfaces to interengage and prevent movement.

While this clamp is especially adapted to secure together two relatively thin plates of metal and the flanges or legs of roller bars, it is to be understood that it may be used for any other work. The details and proportions of the various parts may of course be changed by those skilled in the art without departing from the spirit of my invention as set forth in the following claims.

I claim:—

1. A clamp having sides formed with alined slots and an integral bridge piece connecting the sides, the walls of the slots opposite the bridge piece being straight, the plane of the bridge-piece being at an acute angle to the plane of said opposite walls of the slots, and a wedge adapted to lie between the sides and in contact with the bridge piece and with the work to be held in the clamp and having one side parallel to said opposite walls of the slots.

2. A clamp formed of substantially U-shaped sides and a cross-piece connecting said sides, the slots in the sides being intended to receive the articles to be secured together, the walls of the slots farthest from the cross-piece being straight, and a wedge intended to be driven in between the two sides and between the cross-piece and the articles to be secured together and having the edge in engagement with the work parallel to the walls of the slot which are farthest from the cross-piece.

THOMAS H. KANE.